(12) United States Patent
Hayes et al.

(10) Patent No.: US 11,388,355 B2
(45) Date of Patent: Jul. 12, 2022

(54) MULTISPECTRAL IMAGE PROCESSING SYSTEM AND METHOD

(71) Applicant: Apple Inc., Cupertino, CA (US)

(72) Inventors: Alex Hayes, Ely (GB); Ilya Romanenko, Loughborough (GB)

(73) Assignee: Apple Inc., Cupertino, CA (US)

(*) Notice: Subject to any disclaimer, the term of this patent is extended or adjusted under 35 U.S.C. 154(b) by 209 days.

(21) Appl. No.: 16/900,621

(22) Filed: Jun. 12, 2020

(65) Prior Publication Data

US 2020/0396397 A1    Dec. 17, 2020

(30) Foreign Application Priority Data

Jun. 13, 2019 (GB) ..................................... 1908516

(51) Int. Cl.
  *G06T 5/00* (2006.01)
  *H04N 5/33* (2006.01)
  *G06T 7/10* (2017.01)
  *G06T 5/50* (2006.01)

(52) U.S. Cl.
  CPC ............... *H04N 5/332* (2013.01); *G06T 5/50* (2013.01); *G06T 7/10* (2017.01); *G06T 2207/10024* (2013.01); *G06T 2207/10048* (2013.01); *G06T 2207/20221* (2013.01)

(58) Field of Classification Search
  CPC .. H04N 5/332; G06T 7/10; G06T 5/50; G06T 2207/10024; G06T 2207/10048; G06T 2207/20221
  See application file for complete search history.

(56) References Cited

U.S. PATENT DOCUMENTS

| | | | |
|---|---|---|---|
| 2018/0350050 A1 | 12/2018 | Finlayson | |
| 2019/0318463 A1* | 10/2019 | Zhang | G06T 7/90 |
| 2020/0396397 A1* | 12/2020 | Hayes | H04N 5/332 |
| 2020/0396398 A1* | 12/2020 | Romanenko | G06K 9/0051 |

* cited by examiner

*Primary Examiner* — Sean T Motsinger
(74) *Attorney, Agent, or Firm* — Blank Rome LLP

(57) ABSTRACT

Devices, methods, and non-transitory program storage devices are disclosed herein to provide improved multispectral image processing techniques for generating an enhanced output image, the techniques comprising: obtaining an N-channel (e.g., multispectral) input image; determining fusion weights and fallback weights (e.g., relative intensity weights) for each of the N-channels of the input image; blending the fusion and fallback weights based on an amount of gradient information to generate blended weights; modulating the blended weights for a plurality of frequency band representations of the input image; applying the modulated blended weights to the corresponding frequency band representations of the input image to generate a plurality of output image frequency band representations; producing an output luma image, based on the plurality of output image frequency band representations; and generating an output RGB image, based on the output luma image, which may then, e.g., be displayed to a user or stored to non-volatile memory.

20 Claims, 5 Drawing Sheets

MULTISPECTRAL IMAGE PROCESSING SYSTEM AND METHOD

CROSS-REFERENCE TO RELATED APPLICATION

This application claims priority to the commonly-owned Great Britain patent application bearing serial number GB 1908516.6 and filed Jun. 13, 2019 ("the '516 application"). The '516 application is also hereby incorporated by reference in its entirety.

TECHNICAL FIELD

This disclosure relates generally to the field of digital image processing. More particularly, but not by way of limitation, it relates to techniques for multispectral image processing techniques to enhance a digital image.

BACKGROUND

There are many possible applications where multiple images or image channels may be fused to form a single greyscale or color output. These include computational photography, multispectral photography (e.g., RGB-IR), diffusion tensor imaging (e.g., for medical applications), and remote sensing.

A multitude of devices capture images that are then displayed on monitors or other display devices. Ultimately, the majority of images are interpreted—or simply enjoyed—by human observers. In some cases, going from a captured image to visualized image is fairly straightforward, e.g., images captured with an RGB color camera need only be color-corrected in order to display an image that is perceptually close to the original scene. However, the situation is not as straightforward when, for example, the images are captured outside the visible electro-magnetic spectrum, or when more than three channels (also known as dimensions) are captured.

In many imaging applications a greater number of channels are captured than can be viewed by human observers. While the human visual system can visualize three color dimensions (e.g., red, green, and blue), many image capture systems can capture significantly more information than this, e.g., multispectral and hyperspectral imaging systems can capture upwards of 200 color channels, including images captured in the infra-red (IR) and ultra-violet (UV) ranges.

One way to visualize the information in a multispectral or hyperspectral image is simply to display the section of the signal contained within the visible spectrum. In other words, display the color image that replicates what would be seen by a human observer. The problem with this approach is that information from additional modalities, such as infra-red and ultra-violet, would be lost. Or, more generally, two spectrally different (but metameric, i.e., similarly-perceived) colors would be displayed as being identical. An alternative approach is to blend the information from all channels together and to make a 'false-color' image that reflects the information content of the component image. While this approach will preserve some information from all different modalities, the colors assigned to each object may be markedly different from the objects' true colors.

One approach that attempts to retain and convey information from the source in the output image is image fusion. In image fusion, image details present in N input images (or N input image channels) are combined in some fashion to form a single output image. Image fusion methods include methods based on wavelet decomposition, the Laplacian pyramid and neural networks.

Image gradients are a natural and versatile way of representing image detail information, and, as such, have been used as a basis for several image fusion techniques. A powerful way of summarizing gradient information across N input image channels is called the Di Zenzo structure tensor, which is defined as the 2×2 inner product of the N×2 image Jacobian. Structure tensor-based methods have many applications in computer vision, including in image segmentation and image fusion.

In some approaches, image fusion may be carried out in the derivative image domain. In such cases, a composite fused derivative may be found that best accounts for the detail across all images, so that the resulting gradient field may then be reintegrated. However, because the gradient field reintegration problem (i.e., of non-integrable fields) is inherently ill-posed, derivative domain techniques will always hallucinate detail or other artifacts in the fused image that weren't present in the original image.

Thus, techniques such as those described in the commonly-owned U.S. Patent Publication No. US2018/0350050 (hereinafter, "the '050 application"), which is hereby incorporated by reference in its entirety, have been developed to provide for improved image fusion processing. The '050 application discloses a method and system for generating an output image from a plurality of corresponding input channels, in which fusion weights are calculated from N input image channels, based on image gradient information. More particularly, according to the '050 application, the output image may be generated in image space as a per-pixel projection of the input image channels in the direction of a determined principal characteristic vector of a Jacobian matrix corresponding to the input image channels. The embodiments disclosed herein seek to improve upon the techniques of the the '050 application, e.g., through the use of a multiscale decomposition technique and, additionally, seek to enable a hardware implementation for the fusion operation with reduced resource-overhead.

SUMMARY

Devices, methods, and non-transitory program storage devices are disclosed herein to provide multi-spectral image processing techniques for generating an enhanced output image from a plurality, N, of corresponding input image channels. More particularly, the techniques disclosed herein attempt to perform improved and efficient multi-spectral image fusion that allows for visualization of more detail in the fused output image, while also allowing for desired control over the fused image's appearance (e.g., having improved details with reduced noise, while keep brightness levels similar to the input images' RGB luminance, etc.). According to some embodiments, there is provided a method for image processing, comprising: obtaining an N-channel (e.g., multispectral) input image; determining fusion weights and fallback weights, e.g., relative intensity weights, for each of the N-channels of the input image; blending the fusion and fallback weights based on an amount of gradient information to generate blended weights; modulating the blended weights for a plurality of frequency band representations of the input image; applying the modulated blended weights to the corresponding frequency band representations of the input image to generate a plurality of output image frequency band representations; producing an output luma image, based on the plurality of output image frequency band representations; and generating an output RGB image, based on the output luma image, which may, e.g., be displayed to a user or stored to memory.

According to some embodiments, the various frequency band representations that the input image is decomposed into may be generated as levels in a multiscale decomposition operation, e.g., a so-called difference of Gaussians (DoG) pyramid. In some embodiments, the output frequency band representations or scales may be inverted to produce the output luma image. In some embodiments, original color differences from the input image may be modulated and then added to the output luma image to create the output RGB image.

According to some embodiments, the amount of gradient information may be determined based on the size of the largest eigenvalue of the Jacobian matrix of gradients divided by an estimate of noise at each pixel. In some embodiments, the fusion weights may be calculated according to the techniques described in the '050 application. In some embodiments, the fusion weights may be blended with a fallback weight, e.g., a so-called relative intensity weight, which may be determined based on an input intensity of a given input image channel relative to a summation of the input intensities of the N-channels of the input image. Relative intensity weights may be particularly useful in regions without significant gradient information. These weights may replace the infilling/diffusion of weights described in the '050 application, which may not be feasible without substantial processing and memory operations when operating on a local kernel region.

In some embodiments, the multi-frequency image decomposition may be inverted to produce the output luma image. Original color differences from the input image may then be modulated and added back to the output luma image to create the output RGB image.

The techniques described herein may be implemented on a Field Programmable Gate Array (FPGA) or Application-Specific Integrated Circuit (ASIC) device and may operate in real-time or substantially real-time. The techniques described herein may be implemented on data captured using a multispectral image signal processor (ISP), e.g. using a sensor having Red, Green, Blue and Infrared sensing pixels (i.e., an "RGB-IR" sensor), or using a sensor having Red, Green, Blue and unfiltered (i.e., white) sensing pixels (i.e., an "RGB-W" sensor).

Various non-transitory program storage device embodiments are disclosed herein. Such program storage devices are readable by one or more processors. Instructions may be stored on the program storage devices for causing the one or more processors to perform any of the image white balancing techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

Figure 1:
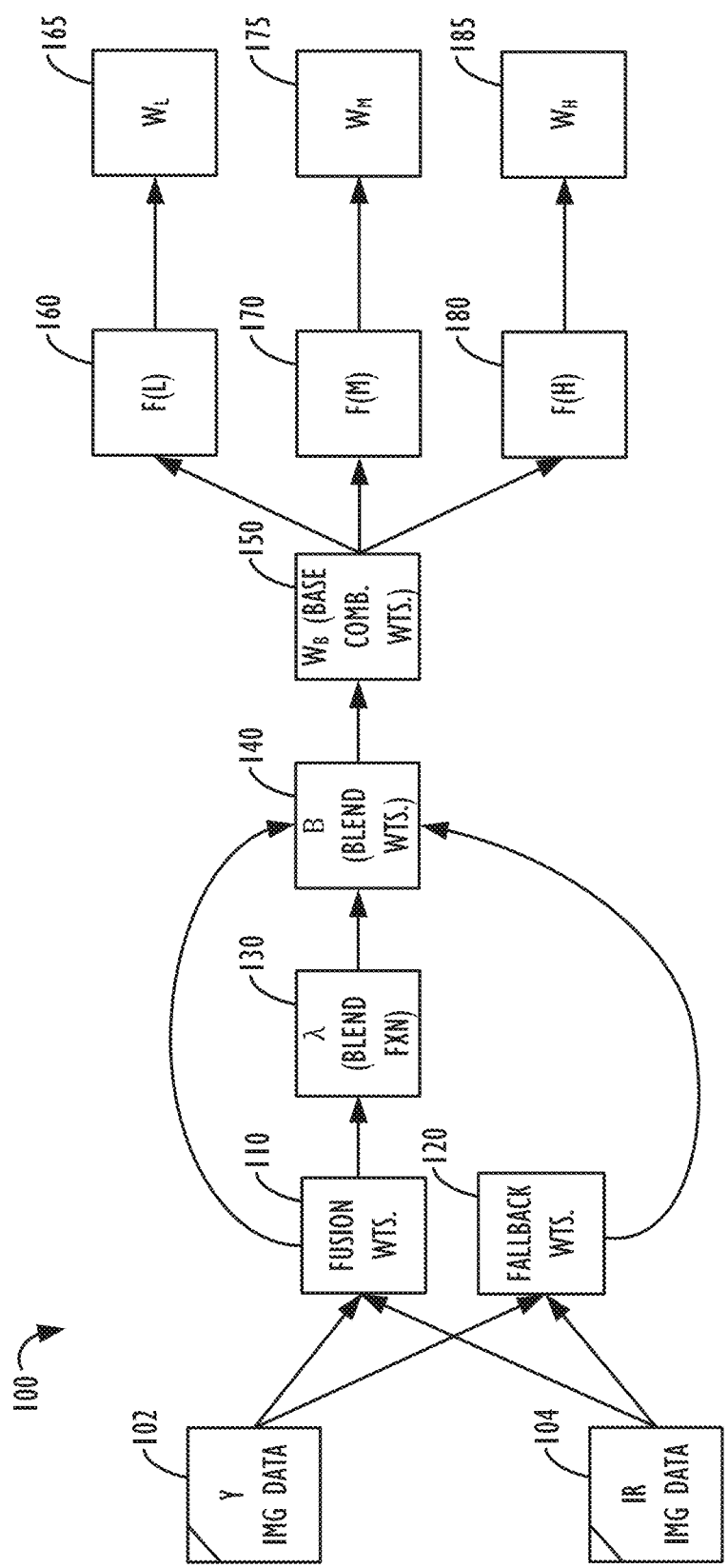
FIG. 1 illustrates an exemplary image fusion weight calculation workflow, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Input Images

According to some embodiments, the multispectral input images for the embodiments described herein may comprise input RGB image channels and an input multispectral (e.g., IR) image channel. The input RGB and multispectral (e.g. IR) images are preferably demosaiced from the RAW Bayer image pattern captured by the sensor using an appropriate interpolation method (e.g., bilinear interpolation), thereby producing full-resolution RGB and multispectral image channels.

After demosaicing, the RGB image contains correlated visible RGB and multispectral data. According to some embodiments, it may be preferable to decorrelate the visible and multispectral image signals as much as possible before fusion, using an appropriate decorrelation method (e.g., using a 4×3 IR subtraction matrix or the method of patent application serial number U.S. Ser. No. 16/825,633, which is herein incorporated by reference in its entirety). The RGB image may then have white balance gains applied to it and/or be color corrected using any appropriate method, such as one or more 3×3 color correction matrices.

Color Decomposition

According to some embodiments, if desired, the input RGB image may be decomposed into luma and chroma layers. Luma is calculated as a weighted average of the input RGB channels. Chroma is calculated as the difference between each RGB channel and luma. The luma channel representation of the input RGB image may then be the channel that is fused with the multispectral image (e.g., IR) channel(s).

Multiscale Decomposition

According to some embodiments, it may be desirable to decompose the input image channels into a number of frequency or scale representations. In some embodiments, each of the input image channels may have a low-pass filter (e.g., a 5×5 kernel filter calculated as $[1\ 2\ 3\ 2\ 1]^T [1\ 2\ 3\ 2\ 1]$) applied to it to produce a frequency band representation or "layer" of a different scale. A high-frequency detail layer may then be calculated as the difference between the input channel and the filtered output channel. Successive filtering iterations may be applied to generate more layers at other scales, and the differences calculated may be used to produce more frequency layers. In some cases, Gaussian filtering may be used for this operation, in which case, the resultant multi-layered image representation structure is commonly known as a "difference of Gaussians" (DoG) pyramid. The final filtering output may then be used as the low-frequency band luma layer.

Weight Calculation

Turning now to FIG. 1, an exemplary image fusion weight calculation workflow 100 is shown, according to one or more embodiments. Workflow 100 shows an example of weight calculations for the case of two input image channels: Y image data (102) represents the visible RGB luma channel, and IR image data (104) represents a greyscale image of the obtained IR image channel.

In block 110, fusion weights are calculated for each pixel in the input image channels, e.g., as explained in the '050 application (such fusion weights may also be referred to herein as "POP weights" or "POP fusion weights," due to the fact that they are determined based on the Principal characteristic vector of the Outer Product, i.e., POP, of the Jacobian matrices of the input image channels). Alternative fusion weights might further include weights based on one or more of: a local entropy estimate for an input image channel, a gradient magnitude estimate for an input image channel, or other high-frequency band information related to the input image.

In FPGA/ASIC devices, algorithms may only have access to pixels in a small neighborhood region of pixels located around the current pixel. Because gradient information is often sparse, in some instances, neither the current pixel nor any pixels in the neighborhood may actually have any meaningful gradient information. In such cases, a so-called "relative intensity" weight, also referred to herein as R, which is a weight based on a smooth function of the relative input intensity, may be calculated and used as a fallback weight. Other fallback weights could also be used, such as programmable global fallback weights, fallback weights based on other image statistics (e.g., noise estimates), or fallback weights upsampled from a low-resolution thumbnail of fallback weights calculated elsewhere.

The fallback weights, e.g., when calculated in the form of a relative intensity weight, R, may be calculated at block 120 as:

$$R_k = I_k \Big/ \sum_{n=1}^{N} I_n, \qquad \text{(Eqn. 1)}$$

where I is the set of input images planes, N is the number of input image planes, and k is the current input image plane number. Image plane, as used here in, refers to any plane of image data (which also may be referred to herein as an image "channel") related to a given image. For example, an RGB image may be comprised of three image planes (a red image plane, a green image plane, and a blue image plane) cover the extent of the image, an RGB-IR image may be comprised of four image planes (a red image plane, a green image plane, a blue image plane, and an image plane of IR data), and so forth.

At block 130, the fusion weights and fallback weights are then alpha blended based on a function (preferably a smooth blending) of the amount of gradient information at each pixel, e.g., as determined by the size of the largest eigenvalue of the Jacobian matrix of gradients divided by the estimate of noise at each pixel, which is also referred to herein as lambda, or λ. The application of the blending function produces blended weights, B, at block 140.

The blended weights, B, may then be used to produce a weight plane comprising the base combined weights for each pixel across the plane of the image at block 150, which weight plane is also referred to herein as $W_B$. The $W_B$ weights across the plane of the input image may then be low-pass filtered, e.g., using a 5×5 kernel filter calculated as $[1\ 2\ 3\ 2\ 1]^T [1\ 2\ 3\ 2\ 1]$ applied in a small kernel region around each pixel, which may be helpful to avoid sharp transitions in strong edge areas.

The $W_B$ weights may then be used as inputs to a set of modulation functions (e.g., as shown in blocks 160/170/180) to produce different weight planes for each frequency representation layer of the image (e.g., as shown in blocks 165/175/185). According to some embodiments, the modulation functions could comprise, e.g., a polynomial function (e.g., of the form ax^2+bx+c), or a programmable 1D Look-up Table. FIG. 1 shows a particular example with three frequency layers, i.e., low (L), medium (M), and high (H), each of which has a respective modulation function and an output set of weights that will be used to generate the output image. It is to be understood that more (or fewer) frequency bands/layers may be used, the frequency bands may have different scales (e.g., with lower resolutions in the lower frequency bands), and that the number of frequency bands used may be predetermined and/or dynamically determined based on the needs of a given implementation, the content of a given input image, and/or the capabilities of a given processing device performing the processing operations.

Output Luma Image Generation

Figure 2:
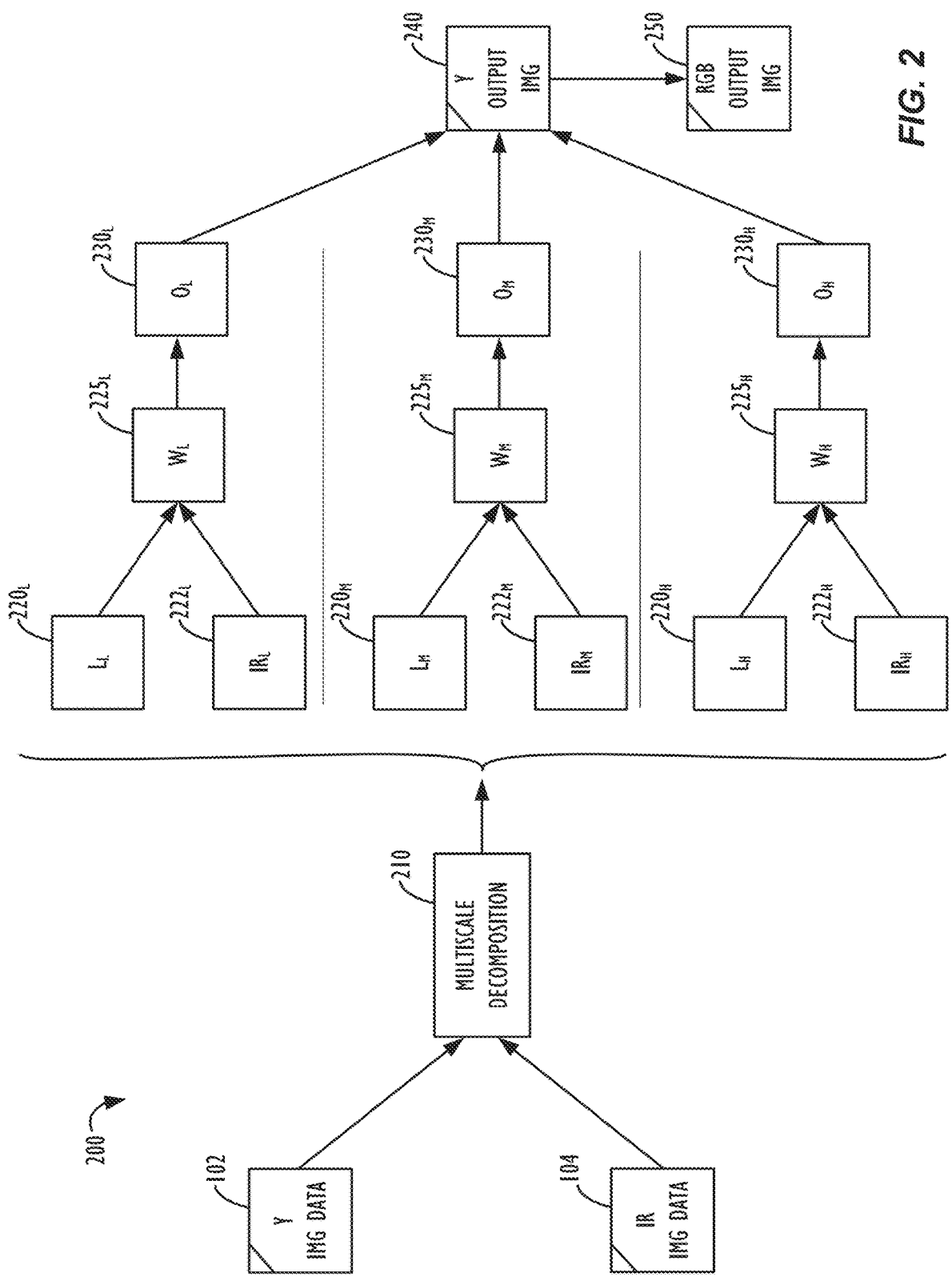
FIG. 2 illustrates an exemplary output luma image generation workflow, according to one or more embodiments.

Turning now to FIG. 2, an exemplary output luma image generation workflow 200 is shown, according to one or more embodiments. FIG. 2 shows an example of output luma generation for the case of the two input image channels introduced in FIG. 1, above: Y image data (102), which represents the visible RGB luma channel, and IR image data (104), which represents a greyscale image of the obtained IR image channel. As will be explained in further detail below, the weights for each frequency layer may be used to independently blend the frequency band coefficients from each input image to produce fused frequency band coefficients.

Turning now to block 210, a multiscale decomposition of Y image data (102) and IR image data (104) into individual scale and frequency band representation layers (e.g., luma layers 220 and IR layers 222) may be performed, e.g., in accordance with the decomposition descriptions above. Then, at blocks $225_L/225_M/225_H$, the respective weight planes $W_L$ 165/$W_M$ 175/$W_H$ 185, e.g., as calculated in accordance with FIG. 1, may be used to create output scale and frequency band representation layers $230_L/230_M/230_H$, respectively, by blending the respective input image channel frequency band representation layers, i.e., $220_L/222_L$, $220_M/222_M$, and $220_H/222_H$, according to their respective weight planes, $225_L/225_M/225_H$.

It is noted that some materials or illumination conditions in scenes can produce multispectral (e.g., IR) responses recorded at the image sensor that are much higher than the visible RGB responses in the scene. In such cases, transferring too much low-frequency brightness may cause some objects (e.g., shiny or metallic objects) to look unnatural. In these cases, positive low-frequency gains (e.g., calculated as output low-frequency layer divided by input low-frequency layer) may be reduced to produce a more natural-looking output image.

In block 240, the output frequency band layers are then added up to produce the output luma image. In cases where the individual frequency band layers have been calculated as differences between scale layers, the inversion of the output frequency bands or scales may be performed as a simple addition operation. As will be explained further below, if desired, at block 250, the output luma image may be converted into an output RGB image, e.g., for display to a user or storage to memory.

Output RGB Image Generation

The chroma layers are preferably modulated based on the change in luma intensity, i.e., to avoid a change in color saturation. A gain ratio may be calculated by dividing the output luma by the input luma. This gain ratio may be given a minimum and maximum value, and may be altered in certain conditions, e.g., if desaturation of colors is desired. The gain ratio may be applied to the color differences by multiplication to produce output color differences. Finally, the output RGB image may be calculated by adding the output color differences to the output luma image.

Exemplary Input and Output Images

Figure 3:
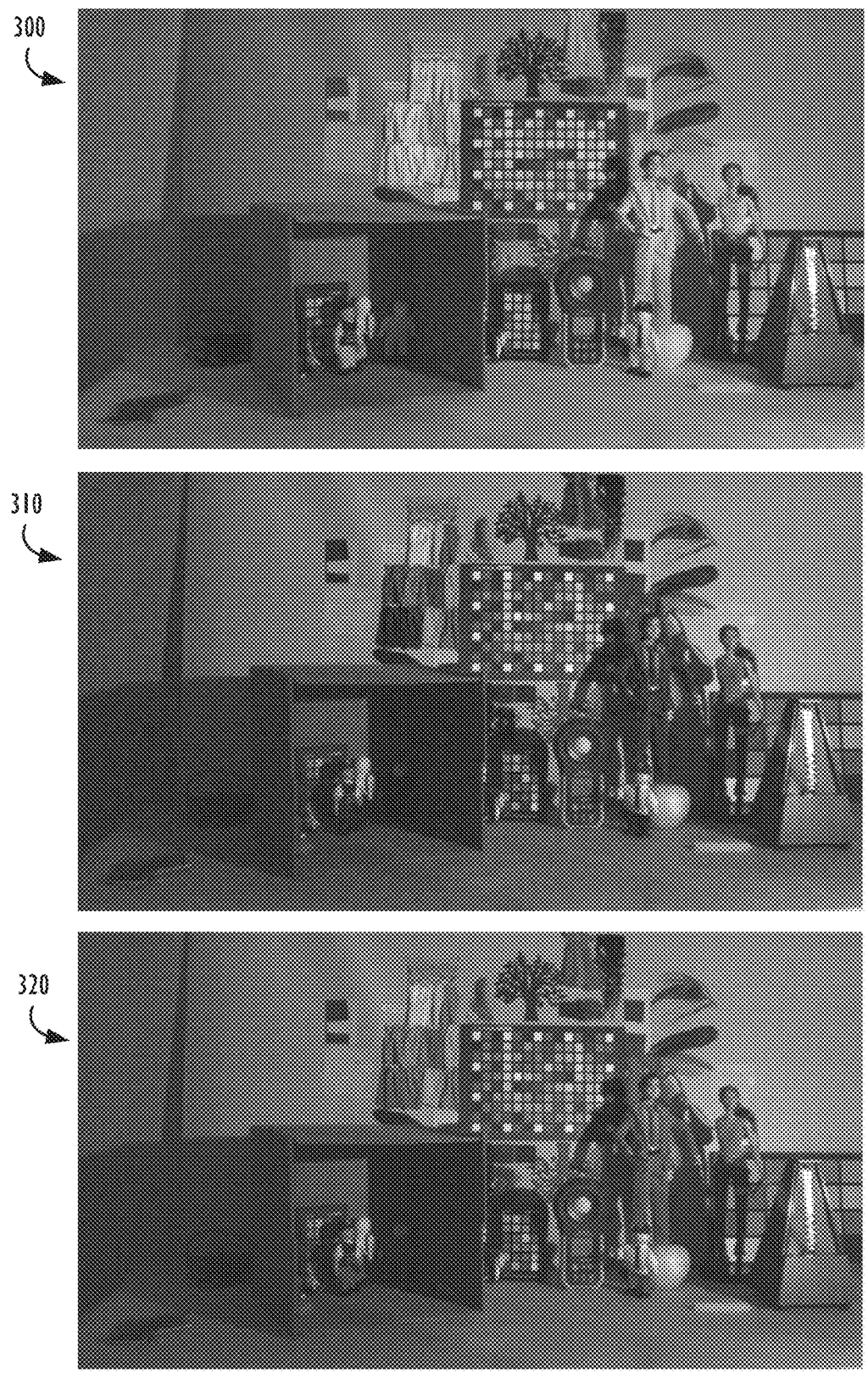
FIG. 3 illustrates an exemplary input and fused output images, according to one or more embodiments.

Turning to FIG. 3, exemplary input images 300/310 and fused output luma image 320 are shown, according to one or more embodiments. Input image 300 represents a greyscale IR input channel. Input image 310 represents the luma channel of the decorrelated RGB input image. The input images 300/310 may be fused as linear (i.e., not gamma-corrected) images, or have a nonlinear transformation applied to them before fusion. In the case that a nonlinear transformation is applied, the transformation should be inverted after the fusion algorithm has completed.

Output luma image 320 shows an example of a fused output luma channel, created using images 300 and 310 as input images. It is clear that noise is reduced, while sharpness and peak signal-to-noise ratio (PSNR) are increased. The output brightness on highly-reflective IR materials, such as the male doll's clothing, is subtly increased, while still maintaining a natural visual appearance.

Exemplary Multispectral Image Processing Operations

Figure 4:
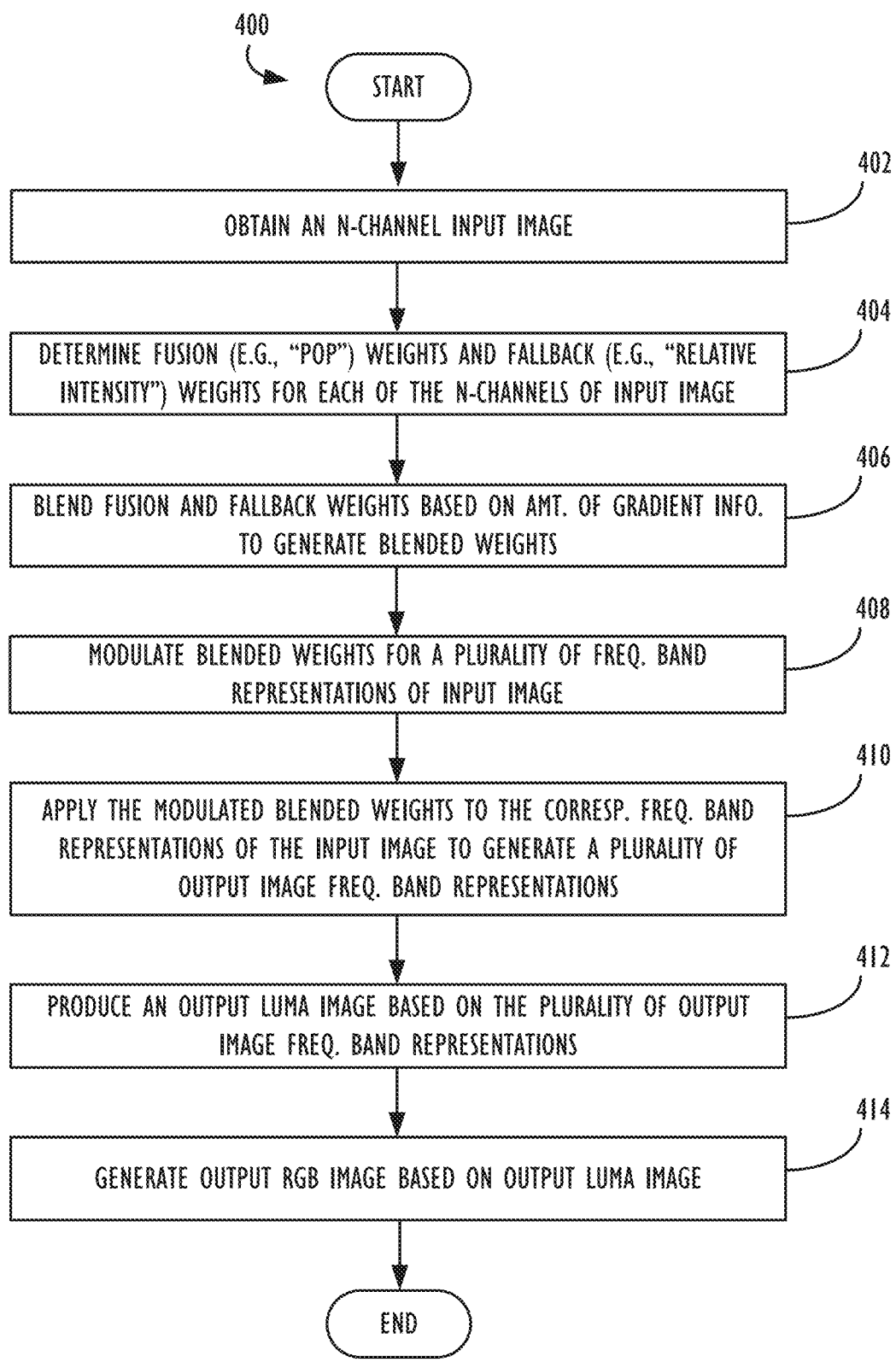
FIG. 4 is flow chart illustrating a method of performing multispectral image fusion, according to one or more embodiments.

Referring now to FIG. 4, a flow chart illustrating a method 400 of performing multispectral image fusion in accordance with the various detailed descriptions given above is shown, according to one or more embodiments. First, at Step 402, the method 400 may obtain an N-channel input image. Next, at Step 404, the method 400 may determine fusion weights (e.g., POP weights) and relative intensity weights (e.g., R) for each of the N-channels of the input image. At Step 406, the method 400 may blend the fusion and relative intensity weights based on an amount of gradient information to generate blended weights. At Step 408, the method 400 may modulate the blended weights for a plurality of frequency band representations of the input image. As may be understood, the coefficients at different levels of an image frequency decomposition represent different frequency bands, but they may also represent image structure at different scales. For example, each decomposition level may be downsampled, as the decomposition reaches lower and lower frequency bands, whereby each pixel of a downsampled decomposition level would map to several (possibly many) pixels in the original image. Thus, the various frequency band representations of the image may also be different in resolution, depending on a given implementation. At Step 410, the method 400 may apply the modulated blended weights to the corresponding frequency band representations of the input image to generate a plurality of output image frequency band representations. At Step 412, the method 400 may produce an output luma image, based on the plurality of output image frequency band representations. Finally, if desired, at Step 414, the method 400 may generate an output RGB image, based on the output luma image, which may, e.g., be displayed to a user or stored to memory.

Exemplary Electronic Computing Devices

Figure 5:
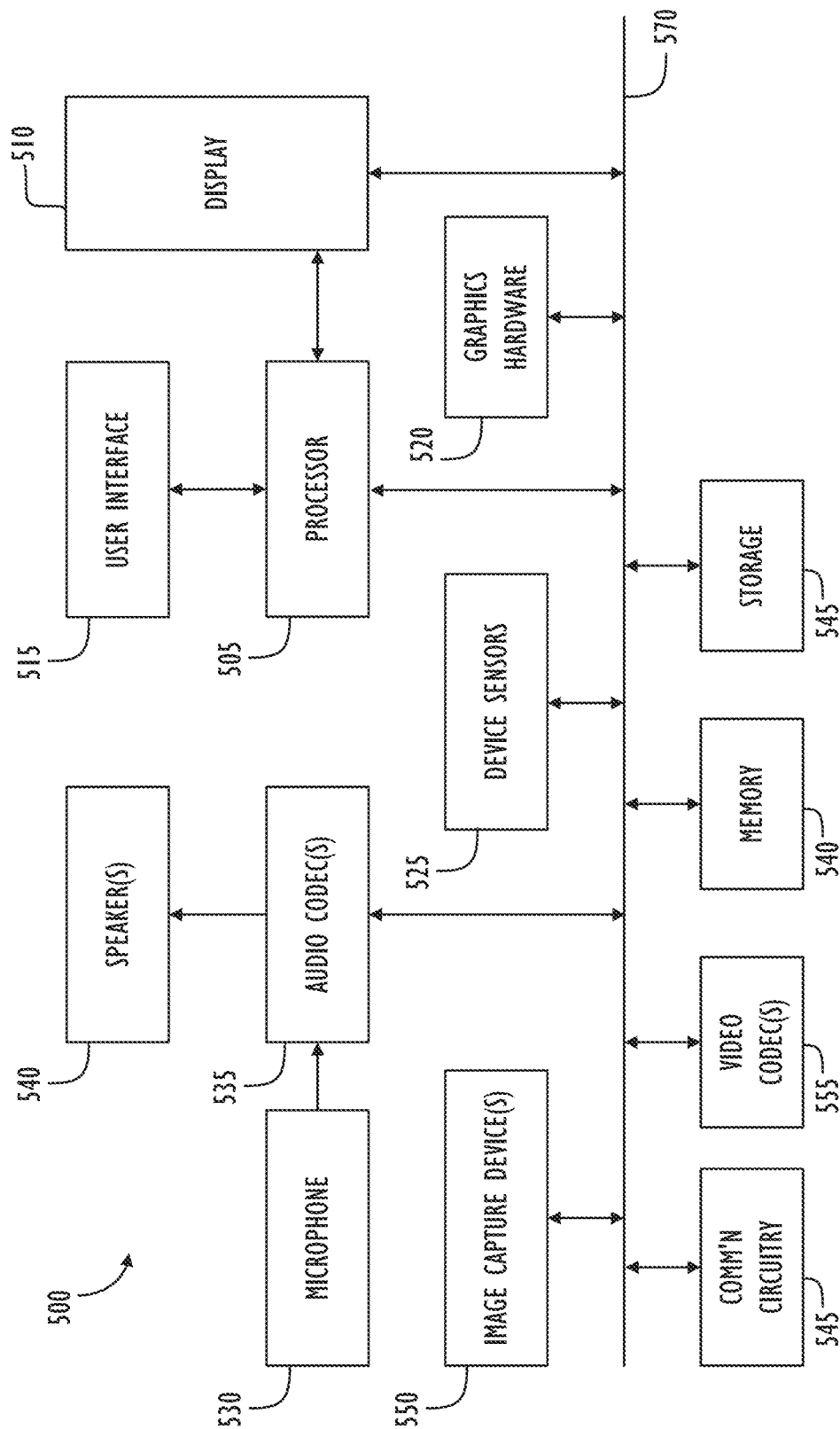
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be processed to generate enhanced versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
one or more image capture devices;
a user interface; and
one or more processors operatively coupled to the memory, wherein the one or more processors are configured to execute instructions causing the one or more processors to:
obtain an N-channel input image;
determine fusion weights and fallback weights for each of the N-channels of the input image;
blend the fusion and fallback weights based on an amount of gradient information in the input image to generate blended weights;
modulate the blended weights for a plurality of frequency band representations of the input image;
apply the modulated blended weights to the corresponding frequency band representations of the input image to generate a plurality of output image frequency band representations; and
produce an output luma image, based on the plurality of output image frequency band representations.

2. The device of claim 1, wherein the N-channel input image comprises an RGB-IR image.

3. The device of claim 1, wherein the instructions further comprise instructions to:
generate an output RGB image based on the output luma image.

4. The device of claim 1, wherein the fusion weights are further determined based, at least in part, on one or more of the following:
a principal characteristic vector of an outer product of Jacobian matrices of the input image's N-channels;
a local entropy estimate from an input image channel; or
a gradient magnitude estimate from an input image channel.

5. The device of claim 1, wherein at least one of the plurality of frequency band representations comprises a high frequency band representation, and wherein the fusion weights are further determined based, at least in part, on information in the high frequency band representation.

6. The device of claim 1, wherein the frequency band representations of the input image are created by a multiscale decomposition process.

7. The device of claim 1, wherein the amount of gradient information at a pixel in the input image is determined based, at least in part, on: a size of a largest eigenvalue of a Jacobian matrix of gradients for the input image; and a noise estimate for the pixel.

8. The device of claim 1, wherein the fallback weight for a given input image channel comprises: a weight based on the input intensity of the given input image channel relative to a summation of the input intensities of the N-channels of the input image.

9. A non-transitory computer readable medium comprising computer readable instructions configured to cause one or more processors to:
obtain an N-channel input image;
determine fusion weights and fallback weights for each of the N-channels of the input image;
blend the fusion and fallback weights based on an amount of gradient information in the input image to generate blended weights;
modulate the blended weights for a plurality of frequency band representations of the input image;
apply the modulated blended weights to the corresponding frequency band representations of the input image to generate a plurality of output image frequency band representations; and
produce an output luma image, based on the plurality of output image frequency band representations.

10. The non-transitory computer readable medium of claim 9, wherein the N-channel input image comprises an RGB-IR image.

11. The non-transitory computer readable medium of claim 9, wherein the plurality of frequency band representations comprises a high frequency band representation, and wherein the fusion weights are further determined based, at least in part, on information in the high frequency band representation.

12. The non-transitory computer readable medium of claim 9, wherein the frequency band representations of the input image are created by a multiscale decomposition process.

13. The non-transitory computer readable medium of claim 9, wherein the amount of gradient information at a pixel in the input image is determined based, at least in part, on: a size of a largest eigenvalue of a Jacobian matrix of gradients for the input image; and a noise estimate for the pixel.

14. The non-transitory computer readable medium of claim 9, wherein the fallback weight for a given input image channel comprises: a weight based on the input intensity of the given input image channel relative to a summation of the input intensities of the N-channels of the input image.

15. An image processing method, comprising:
obtaining an N-channel input image;
determining fusion weights and fallback weights for each of the N-channels of the input image;
blending the fusion and fallback weights based on an amount of gradient information in the input image to generate blended weights;
modulating the blended weights for a plurality of frequency band representations of the input image;
applying the modulated blended weights to the corresponding frequency band representations of the input image to generate a plurality of output image frequency band representations; and
producing an output luma image, based on the plurality of output image frequency band representations.

16. The method of claim 15, wherein the N-channel input image comprises an RGB-IR image.

17. The method of claim 15, further comprising:
generating an output RGB image based on the output luma image.

18. The method of claim 17, wherein generating an output RGB image based on the output luma image further comprises:
determining original color differences for pixels in the input image;
modulating the determined original color differences for pixels in the input image; and
adding the modulated determined original color differences for the pixels in the input image to the corresponding pixels in the output luma image to generate the output RGB image.

19. The method of claim 15, wherein the frequency band representations of the input image are created by a difference of Gaussians (DoG) pyramid operation.

20. The method of claim 15, wherein the method is performed, at least in part, by a Field Programmable Gate Array (FPGA) or an Application-Specific Integrated Circuit (ASIC).

* * * * *